United States Patent
Vejlgaard et al.

(10) Patent No.: US 11,539,388 B2
(45) Date of Patent: Dec. 27, 2022

(54) APPARATUS FOR RECEIVING RADIO FREQUENCY SIGNALS AND METHOD OF OPERATING AN APPARATUS

(71) Applicant: Nokia Technologies Oy, Espoo (FI)

(72) Inventors: Benny Vejlgaard, Gistrup (DK); Simon Svendsen, Aalborg (DK); Johannes Harrebek, Aalborg (DK); Christian Rom, Aalborg (DK); Samantha Caporal Del Barrio, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/179,534

(22) Filed: Feb. 19, 2021

(65) Prior Publication Data

US 2021/0266023 A1    Aug. 26, 2021

(30) Foreign Application Priority Data

Feb. 26, 2020 (EP) .................................... 20159498

(51) Int. Cl.
*H04B 1/10* (2006.01)
*H04B 1/00* (2006.01)

(52) U.S. Cl.
CPC ......... *H04B 1/1081* (2013.01); *H04B 1/0064* (2013.01); *H04B 1/1027* (2013.01)

(58) Field of Classification Search
CPC ... H04B 1/1081; H04B 1/0064; H04B 1/1027
See application file for complete search history.

(56) References Cited

U.S. PATENT DOCUMENTS

| 2012/0281550 | A1  | 11/2012 | Huang |              |
|--------------|-----|---------|-------|--------------|
| 2013/0033996 | A1  | 2/2013  | Song et al. | |
| 2013/0196609 | A1* | 8/2013  | Ancora | .............. H04B 1/44 |
|              |     |         |       | 455/78 |
| 2014/0133528 | A1* | 5/2014  | Noest | ............... H03C 5/00 |
|              |     |         |       | 375/219 |
| 2018/0152248 | A1* | 5/2018  | Sung  | .............. H04B 10/58 |

(Continued)

FOREIGN PATENT DOCUMENTS

| CN | 109391302 A    | 2/2019  |
| EP | 3442131 A1     | 2/2019  |
| WO | 2004098081 A1  | 11/2004 |
| WO | 2018/232294 A1 | 12/2018 |

OTHER PUBLICATIONS

"Revised SID on Study on NR beyond 52.6GHz", 3GPP TSG RAN Meeting #82, RP-182861, Agenda: 9.3.17, Intel Corporation, Dec. 10-13, 2018, pp. 1-4.

(Continued)

*Primary Examiner* — Janice N Tieu
(74) *Attorney, Agent, or Firm* — Mendelsohn Dunleavy, P.C.; Steve Mendelsohn (57) ABSTRACT

Apparatus for receiving radio frequency, RF, signals, comprising at least two antenna panels, wherein each of the at least two antenna panels is configured to provide a respective received signal with an associated frequency spectrum, wherein the apparatus is configured to apply a frequency shift to at least one of the received signals such that center frequencies of at least two adjacent frequency spectra comprise a predetermined frequency distance from each other.

18 Claims, 4 Drawing Sheets

(56) References Cited

U.S. PATENT DOCUMENTS

| | | | |
|---|---|---|---|
| 2018/0159585 A1* | 6/2018 | Kanumalli | H04L 25/02 |
| 2018/0252807 A1* | 9/2018 | Fox | G01S 13/904 |
| 2018/0255472 A1 | 9/2018 | Chendamarai Kannan et al. | |
| 2018/0309526 A1 | 10/2018 | Zhang et al. | |
| 2019/0200249 A1 | 6/2019 | Yoon et al. | |
| 2020/0107327 A1* | 4/2020 | Wang | H04B 7/0695 |
| 2020/0389173 A1* | 12/2020 | Jang | H04L 7/0332 |

OTHER PUBLICATIONS

Fischman et al., "A Digital Beamforming Processor for the Joint Dod/nasa Space Based Radar Mission", Proceedings of the 2004 IEEE Radar Conference (IEEE Cat. No.04CH37509), Apr. 2004, pp. 9-14.

Kappen et al., "Towards a Robust Multi-antenna Mass Market Gnss Receiver", Proceedings of the 2012 IEEE/ION Position, Location and Navigation Symposium, Apr. 2012, pp. 291-300.

"3rd Generation Partnership Project; Technical Specification Group Services and System Aspects; Release 15 Description; Summary of Rel-15 Work Items (Release 15)", 3GPP TR 21.915 V15.0.0, Sep. 2019, pp. 1-118.

Extended European Search Report received for corresponding European Patent Application No. 20159498.3, dated Jun. 8, 2020, 10 pages.

First Office Action for corresponding Chinese application No. 2021102167254; dated Mar. 1, 2022 (15 pages).

Second Office Action for corresponding Chinese application No. 202110216725.4; dated Sep. 1 2022 (18 pages) Machine Translation.

\* cited by examiner

APPARATUS FOR RECEIVING RADIO FREQUENCY SIGNALS AND METHOD OF OPERATING AN APPARATUS

FIELD OF THE DISCLOSURE

Exemplary embodiments relate to an apparatus for receiving radio frequency, RF, signals.

Further exemplary embodiments relate to a method of operating an apparatus for receiving RF signals.

BACKGROUND

Apparatus and methods of the aforementioned type can be used to process radio frequency, RF, signals, e.g. for mobile radio devices for cellular communications systems, such as e.g. for user equipment (UE).

In the context of 3rd Generation Partnership Project, 3GPP, new radio, NR, development, Beam Management is a set of functionalities to assist UE to set its receive, RX, and transmit, TX, beams for downlink, DL, receptions and uplink, UL, transmissions, respectively. The functionalities can be categorized roughly to four categories:
1. Beam Indication (Assist UE to set its RX and TX beam properly for the reception of DL and transmission of UL, respectively),
2. Beam Acquisition, Measurements and Reporting (Procedures for providing gNB knowledge about feasible DL and UL beams for the UE),
3. Beam Recovery (For rapid link reconfiguration against sudden blockages, i.e. fast re-aligning of gNB and UE beams),
4. Beam Tracking and Refinement (Set of procedures to refine gNB and UE side beams).

SUMMARY

The scope of protection sought for various embodiments of the invention is set out by the independent claims. The exemplary embodiments and features, if any, described in this specification, that do not fall under the scope of the independent claims, are to be interpreted as examples useful for understanding various exemplary embodiments of the invention.

Exemplary embodiments relate to an apparatus for receiving radio frequency, RF, signals, comprising at least two antenna panels, wherein each of the at least two antenna panels is configured to provide a respective received signal with an associated frequency spectrum, wherein the apparatus is configured to apply a frequency shift to at least one of the received signals or to at least one signal derived from at least one of the received signals such that center frequencies of at least two adjacent frequency spectra comprise a predetermined frequency distance from each other. This enables to at least temporarily separate the frequency spectra related to the different antenna panels such that e.g. common signal processing is enabled, which according to further exemplary embodiments explained in detail further below may e.g. comprise simultaneous or at least partly temporally overlapping processing. In other words, according to further exemplary embodiments, by applying the frequency shift, different frequency spectra of different received signals may be assigned or shifted to, respectively, different frequency ranges e.g. of an overall processing bandwidth, so that common signal processing within the overall processing bandwidth is possible without (substantial) interference between the adjacent frequency spectra.

According to further exemplary embodiments, the apparatus according to the embodiments may e.g. be used for and/or within a UE of a wireless, particularly cellular, communications systems such as e.g. of the 5G (fifth generation) type. Particularly, exemplary embodiments may e.g. be used for enhancing existing UE and/or UE-related procedures of 5G Release 15, cf. e.g. 3GPP TR 21.915 V15.0.0 (2019 September), thus e.g. enhancing a conventional UE.

According to further exemplary embodiments, the apparatus may e.g. be configured to receive and/or process RF signals in at least one of the frequency ranges FR1, FR2 as e.g. defined in Table 5.5.4.1-1 of 3GPP TR 21.915 V15.0.0 (2019 September).

Further, there is currently an ongoing study item titled "Study on NR beyond 52.6 GHz" (RP-182861) considering using RF signals in frequency ranges above FR2. According to further exemplary embodiments, the apparatus may e.g. be configured to receive and/or process RF signals in at least one frequency range above 52.6 GHz.

According to further exemplary embodiments, the apparatus is configured to apply the frequency shift to the at least one of the received signals such that the at least two frequency spectra of the received signals do not overlap, i.e. after application of the frequency shift.

While the aforementioned example focuses on two adjacent frequency spectra, for simplicity, according to further exemplary embodiments, and without loss of generality, the principle according to the embodiments may also be applied to more than two antenna panels and their related received signals and associated frequency spectra. As an example, if the apparatus comprises three antenna panels, applying the frequency shift may e.g. be performed such that the associated frequency spectra of the received signals of the three antenna panels are arranged adjacent to each other, optionally with a predetermined frequency gap ("guard band") therebetween, to ensure non-overlapping arrangement thus avoiding interference between the frequency spectra.

According to further exemplary embodiments, the apparatus comprises at least one frequency shift unit, particularly a coordinate rotation digital computer, CORDIC, unit, for applying a frequency shift to at least one of the received signals. According to further exemplary embodiments, the CORDIC unit may also be denoted as "rotational CORDIC unit".

According to further exemplary embodiments, at least one of the antenna panels may comprise a plurality (e.g., 8 or more, particularly 13 or more, more particularly 20 or more, e.g. 33) of antenna elements and/or an antenna array, e.g. of the uniform linear array, ULA, type.

According to further exemplary embodiments, the apparatus comprises at least two RF front ends associated with a respective one of the at least two antenna panels, wherein the at least one frequency shift unit, e.g. CORDIC unit, is arranged in at least one of the at least two RF front ends, wherein preferably each of the at least two RF front ends comprises one frequency shift unit.

According to further exemplary embodiments, at least one of the RF front ends, preferably all RF front ends, may comprise at least one of: a) low noise amplifier, LNA, preferably controllable LNA, b) phase shifter, PS, preferably controllable PS, c) a combiner. As an example, a signal processing chain of the RF front end may comprise an LNA receiving an RF signal from a single antenna element of the antenna panel, the LNA being configure to amplify the RF signal from the single antenna element, and a phase shifter to apply a phase shift to the output signal of the LNA. As a further example, the RF front end may comprise a first number of such processing chains which corresponds with the number of individual antenna elements of the antenna panel. According to further exemplary embodiments, the output signals of the phase shifters may be combined, i.e. added, by means of the combiner. According to further exemplary embodiments, an output signal of the combiner may be considered as the received signal of an antenna panel, to which e.g. the frequency shift may be applied.

According to further exemplary embodiments, at least one of the RF front ends, preferably all RF front ends, may comprise a mixer for down-converting the received signal of the antenna panel, i.e., shifting the received signal of the antenna panel from an RF frequency range which may e.g. correspond with a carrier frequency and/or center frequency of the RF signals, to an intermediate frequency, IF, or a baseband frequency range, whereby a down-converted signal may be obtained.

According to further exemplary embodiments, at least one of the RF front ends, preferably all RF front ends, may comprise an analog-to-digital converter, ADC, to transform the down-converted signal from the analog domain to the digital domain, i.e. into a series of discrete amplitude values ("digital signal").

According to further exemplary embodiments, the frequency shift unit, e.g. CORDIC unit, applies the frequency shift to the digital signal as obtained at the output of the ADC.

According to further exemplary embodiments, the apparatus comprises a transceiver stage for processing the received signals, wherein the at least one frequency shift unit is arranged in the transceiver stage, wherein preferably each receiver chain of the transceiver stage comprises one frequency shift unit. In this respect, according to further exemplary embodiments, the transceiver stage may comprise at least one of: the mixer, the ADC as mentioned above in the context of the RF front end, and the frequency shift unit, e.g. CORDIC unit, may e.g. also be provided in the transceiver stage and may apply the frequency shift to the digital signal as obtained at the output of the ADC in the transceiver stage. In these embodiments, the RF front ends are not required to comprise a mixer and/or ADC and/or frequency shift unit, as these components are provided in the transceiver stage. In other words, according to further exemplary embodiments, the RF front ends may provide the output signals of their respective combiner to the transceiver stage, where further processing by means of the mixer, ADC and frequency shift unit, may be provided.

According to further exemplary embodiments, the at least one frequency shift unit is arranged between a or the transceiver stage and a or the RF front end.

According to further exemplary embodiments, a or the transceiver stage and, optionally, a baseband processing stage of the apparatus are configured to process signals with a bandwidth corresponding to an aggregated bandwidth of the frequency spectra associated with the at least two antenna panels, preferably corresponding to an aggregated bandwidth of the frequency spectra associated with all antenna panels of the apparatus. This enables to simultaneously process, e.g. by means of the baseband processing stage and/or the transceiver stage, signals related to the plurality of frequency spectra associated with the at least two antenna panels.

According to further exemplary embodiments, the apparatus, preferably the baseband processing stage and/or the transceiver stage, is configured to separate the frequency spectra associated with the at least two antenna panels, for example by filtering. This way, individual received signals associated with individual ones of the antenna panels may be "reconstructed" by the baseband processing stage and/or the transceiver stage, e.g. for decoding.

According to further exemplary embodiments, the apparatus is configured to at least temporarily operate the at least two antenna panels simultaneously or in a temporally at least partly overlapping fashion, whereby e.g. beam measurements and/or other aspects, e.g. of Beam Management, particularly at a UE side, may be accelerated.

According to further exemplary embodiments, the apparatus is configured to perform at least one of: configuring the at least two antenna panels for simultaneous or temporally at least partly overlapping operation, configuring a or the transceiver stage and/or a or the baseband processing stage to operate with a bandwidth corresponding to an aggregated bandwidth of the receive signals of the configured at least two antenna panels, configuring the RF front ends of at least two antenna panels to perform measurements, particularly regarding a single codebook entry, processing the measurements, wherein the processing preferably comprises separating the frequency spectra of different ones of the measurements and decoding, preferably individually, each of the measurements.

According to further exemplary embodiments, the apparatus is configured to at least temporarily perform at least one of the following elements using the at least two antenna panels in parallel (or at least in a temporally overlapping fashion): initial beam acquisition, user equipment mobility measurements, radio link failure recovery procedures, e.g. to find an optimum communication path, e.g. with a base station such as a gNodeB (gNB).

Further exemplary embodiments relate to a user equipment, UE, comprising at least one apparatus according to the embodiments.

Further exemplary embodiments relate to a method of operating an apparatus for receiving radio frequency, RF, signals, comprising at least two antenna panels, wherein each of the at least two antenna panels is configured to provide a respective received signal with an associated frequency spectrum, wherein the apparatus applies a frequency shift to at least one of the received signals such that center frequencies of at least two adjacent frequency spectra comprise a predetermined frequency distance from each other.

According to further exemplary embodiments, the apparatus applies the frequency shift to the at least one of the received signals such that the at least two frequency spectra of the received signals do not overlap.

According to further exemplary embodiments, the apparatus at least temporarily performs at least one of the following elements using the at least two antenna panels in parallel: initial beam acquisition, user equipment mobility measurements, radio link failure recovery procedures.

Further exemplary embodiments relate to a use of the apparatus according to the embodiments and/or the UE according to the embodiments and/or the method according to the embodiments for at least one of: a) simultaneous reception of RF signals from a plurality of antenna panels, b) performing at least one of the following elements using the at least two antenna panels in parallel: initial beam acquisition, user equipment mobility measurements, radio link failure recovery procedures, c) decreasing a time needed for switching to another UE antenna panel and/or beam, d) enabling monitoring of alternative links without disturbing an existing primary link, e) reducing a search time for beam search, f) reducing a current and/or energy consumption, particularly for beam search, g) reducing a scanning time for initial (beam) acquisition and/or neighbor cell measurements.

BRIEF DESCRIPTION OF THE FIGURES

Some exemplary embodiments will now be described with reference to the accompanying drawings in which.

DESCRIPTION OF EXEMPLARY EMBODIMENTS

Figure 1:
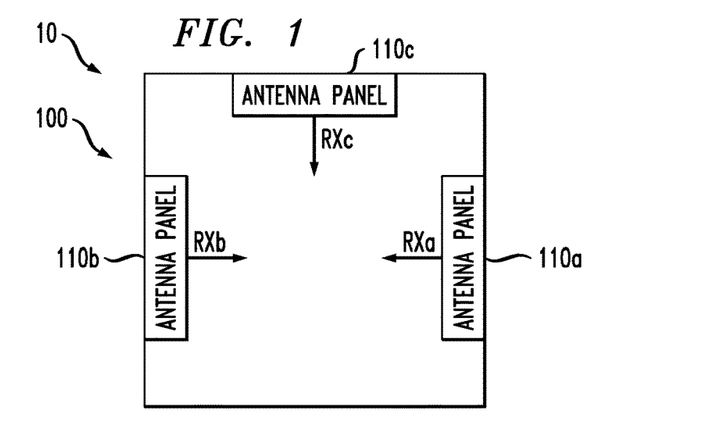
FIG. 1 schematically depicts a simplified block diagram of a user equipment according to exemplary embodiments, FIG. 2 schematically depicts a simplified block diagram of an antenna panel according to further exemplary embodiments, FIG. 3 schematically depicts an apparatus according to prior art, FIG. 4 schematically depicts a simplified block diagram of an apparatus according to further exemplary embodiments, FIG. 5 schematically depicts a simplified block diagram of an apparatus according to further exemplary embodiments, FIG. 6 schematically depicts a simplified block diagram of an apparatus according to further exemplary embodiments, FIG. 7 schematically depicts frequency spectra according to further exemplary embodiments, FIG. 8A, 8B, 8C, 8D each schematically depict a simplified flow chart of a method according to further exemplary embodiments, and FIG. 9A, 9B each schematically depict power values over a codebook index according to further exemplary embodiments.

FIG. 1 schematically depicts a simplified block diagram of an apparatus 100 for receiving radio frequency, RF, signals according to exemplary embodiments, the apparatus 100 comprising at least two (presently for example three) antenna panels 110a, 110b, 110c.

According to further exemplary embodiments, the apparatus 100 may e.g. be used for and/or within a user equipment (UE) 10 of a wireless, particularly cellular, communications systems such as e.g. of the 5G (fifth generation) type. Particularly, further exemplary embodiments may e.g. be used for enhancing existing UE and/or UE-related procedures of 5G Release 15, cf. e.g. 3GPP TR 21.915 V15.0.0 (2019 September), thus e.g. enhancing a conventional 5G/NR capable UE.

According to further exemplary embodiments, the apparatus 100 may e.g. be configured to receive and/or process RF signals in at least one of the frequency ranges FR1, FR2 as e.g. defined in Table 5.5.4.1-1 of 3GPP TR 21.915 V15.0.0 (2019 September).

Further, there is currently an ongoing study item titled "Study on NR beyond 52.6 GHz" (RP-182861) considering using RF signals in frequency ranges above FR2. According to further exemplary embodiments, the apparatus 100 may e.g. be configured to receive and/or process RF signals in at least one frequency range above 52.6 GHz.

According to further exemplary embodiments, the antenna panels 110a, 110b, 110c may be arranged at different locations and/or with different orientations with respect to each other and/or a common reference such as a common carrier (not depicted) and/or a reference plane of the UE, e.g. a printed circuit board of the UE 10 or the like.

Figure 7:
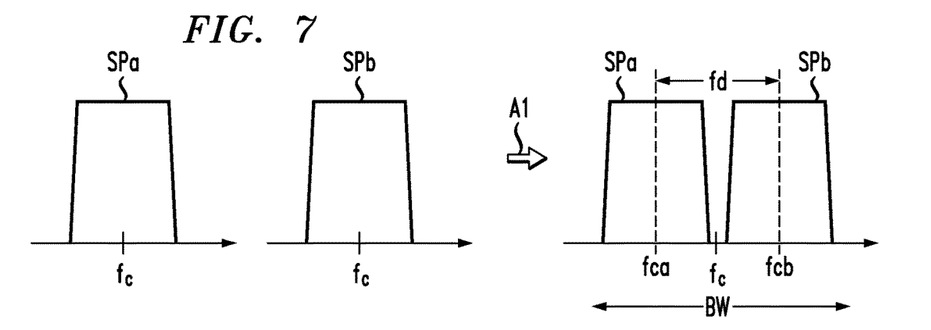

According to further exemplary embodiments, each of the at least two antenna panels 110a, 110b, 110c is configured to provide a respective received signal RXa, RXb, RXc with an associated frequency spectrum, wherein the apparatus 100 is configured to apply a frequency shift to at least one of the received signals RXa, RXb, RXc or to at least one signal derived from at least one of the received signals RXa, RXb, RXc such that center frequencies of at least two adjacent frequency spectra comprise a predetermined frequency distance from each other. This is schematically depicted by FIG. 7, showing on the left side the spectra SPa, SPb of the received signals RXa, RXb prior to applying the frequency shift, and on the right side after applying the frequency shift, with their center frequencies fca, fcb being spaced apart by the frequency distance or difference fd=fcb−fca. Presently, as an example, the spectrum SPa has been shifted from its original center frequency fc (cf. left side of FIG. 7, fc may e.g. represent a carrier frequency of the received RF signals) to the center frequency fca, and the spectrum SPb has been shifted from its original center frequency fc (cf. left side of FIG. 7) to the center frequency fcb.

This enables to at least temporarily separate the frequency spectra SPa, SPb related to the different antenna panels 110a, 110b (FIG. 1) such that e.g. common signal processing of both spectra SPa, SPb is enabled, which according to further exemplary embodiments explained in detail further below may e.g. comprise simultaneous or at least partly temporally overlapping processing. In other words, according to further exemplary embodiments, by applying the frequency shift, different frequency spectra SPa, SPB of different received signals RXa, RXb may be assigned or shifted to, respectively, different frequency ranges e.g. of an overall processing bandwidth BW (FIG. 7), so that common signal processing within the overall processing bandwidth BW is possible without (substantial) interference between the adjacent frequency spectra.

According to further exemplary embodiments, the apparatus 100 (FIG. 1) is configured to apply the frequency shift to the at least one of the received signals RXa, RXb such that the at least two frequency spectra SPa, SPb (FIG. 7) of the received signals do not overlap, i.e. after application of the frequency shift.

Figure 8A:
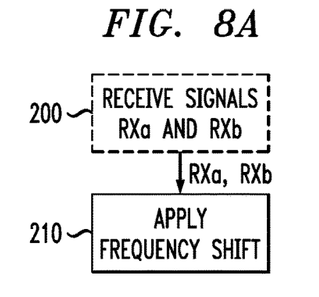

FIG. 8A exemplarily depicts a simplified flow chart comprising the steps 200 of receiving the signals RXa, RXb and 210 of applying the frequency shift to the at least one of the received signals RXa, RXb.

While the aforementioned example focuses on two adjacent frequency spectra SPa, SPb, for simplicity, according to further exemplary embodiments, and without loss of generality, the principle according to the embodiments may also be applied to more than two antenna panels 110a, 100b, 110c and their related received signals RXa, RXb, RXc and associated frequency spectra. As an example, if the apparatus 100 comprises three antenna panels 110a, 110b, 110c, as exemplarily depicted by FIG. 1, applying the frequency shift may e.g. be performed such that the associated frequency spectra of the received signals RXa, RXb, RXc of the three antenna panels 110a, 110b, 110c are arranged adjacent to each other, optionally with a predetermined frequency gap ("guard band") therebetween, to ensure non-overlapping arrangement thus avoiding interference between the frequency spectra.

Figure 3:
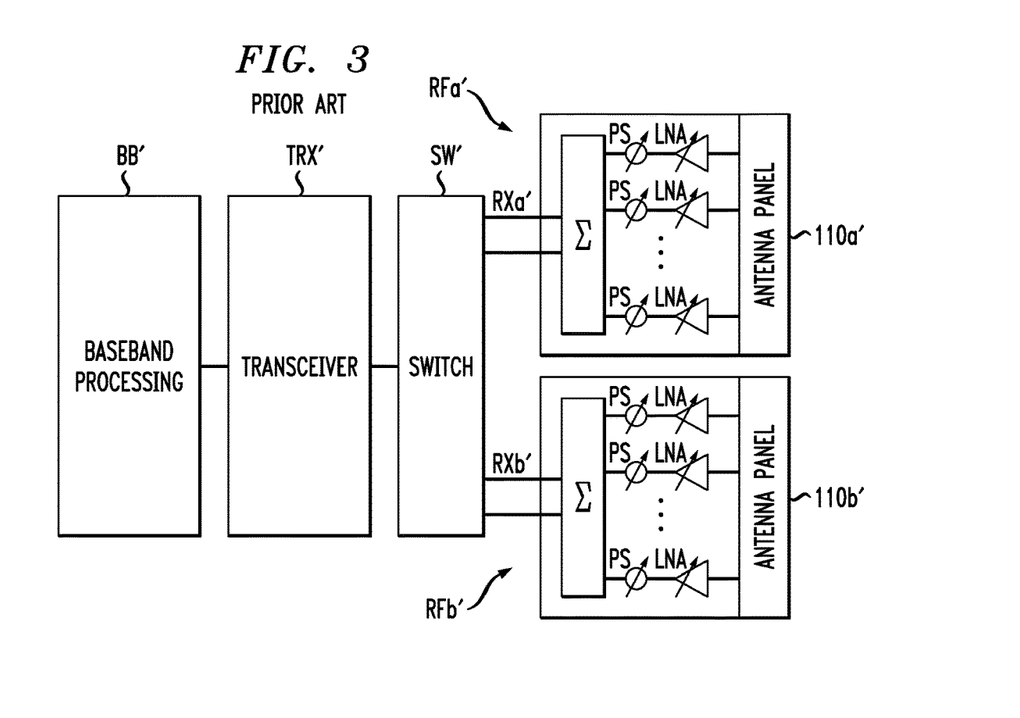

By contrast, conventional apparatus for receiving RF signals may comprise a structure as exemplarily depicted by FIG. 3, wherein two antenna panels 110a', 110b' provide received signals RXa', RXb' via respective RF front ends RFa', RFb' to a switch SW which selectively provides either the received signal RXa' or the received signal RXb' at a time to a transceiver stage TRX' and a subsequent baseband processing stage BB'. This way, the received signals RXa', RXb' may only be processed in a time-multiplexed manner, i.e. one after the other, which may be comparatively slow and energy consuming. At least some of these aspects can at least temporarily approved by at least some of the exemplary embodiments explained herein. As an example, as simultaneous processing of several received signals RXa, RXb, RXc (FIG. 1) may be enabled, this effects an acceleration with respect to a strictly time-multiplexed processing as provided by the conventional components SW, TRX', BB' of FIG. 3. Also, energy consumption may at least sometimes be reduced by simultaneous processing of several received signals RXa, RXb, RXc, because the activation periods of individual components may be reduced due to said simultaneous processing.

Figure 4:
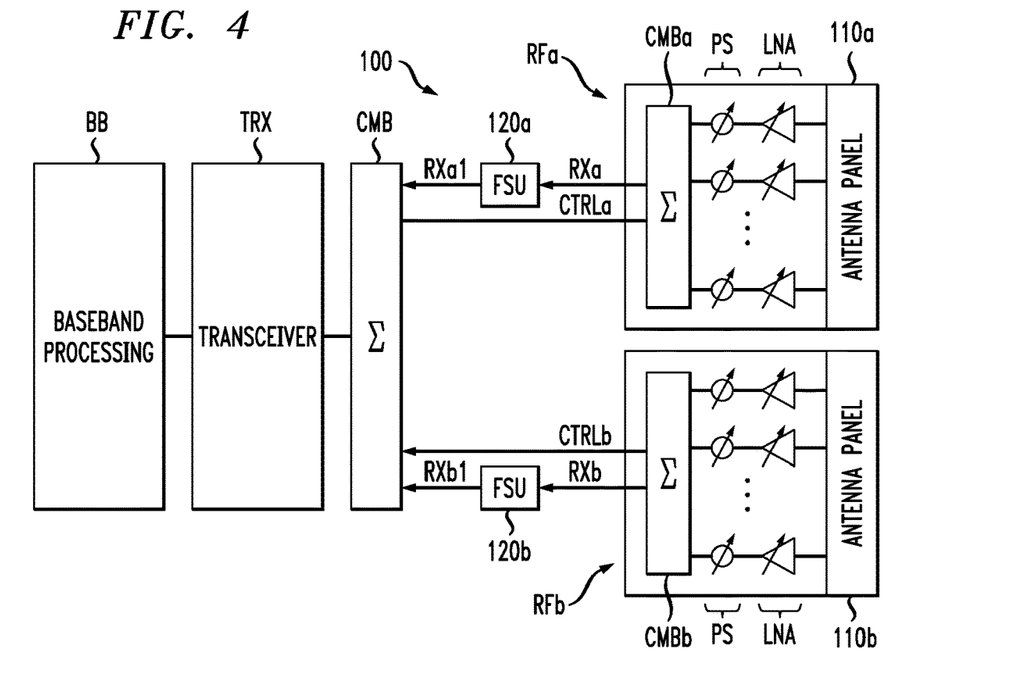

According to further exemplary embodiments, cf. e.g. FIG. 4, the apparatus 100 comprises at least one frequency shift unit 120a, 120b, particularly a coordinate rotation digital computer, CORDIC, unit, 120a, 120b for applying a frequency shift to at least one of the received signals RXa, RXb. According to further exemplary embodiments, the CORDIC unit may also be denoted as "rotational CORDIC unit". As an example, a frequency shifted signal derived from the received signal RXa is denoted with reference sign RXa1 in FIG. 4, and a frequency shifted signal derived from the received signal RXb is denoted with reference sign RXb1 in FIG. 4.

According to further exemplary embodiments, the apparatus 100 (FIG. 4) comprises at least two RF front ends RFa, RFb associated with a respective one of the at least two antenna panels 110a, 110b.

Figure 2:
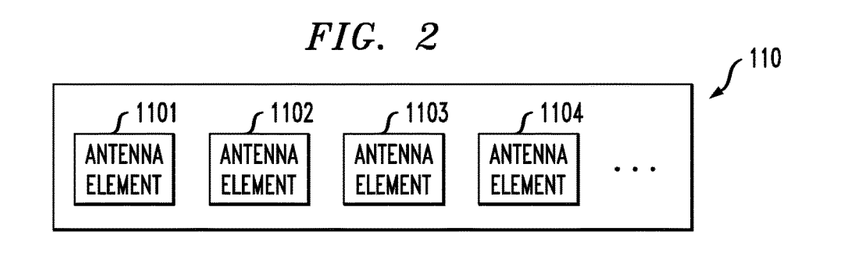

According to further exemplary embodiments, at least one of the antenna panels 110a, 110b may comprise a plurality (e.g., 8 or more, particularly 13 or more, more particularly 20 or more, e.g. 33) of antenna elements and/or an antenna array, e.g. of the uniform linear array, ULA, type. In this regard, FIG. 2 exemplarily depicts an antenna panel 110 having four antenna elements 1101, 1102, 1103, 1104. Optionally, according to further exemplary embodiments, further antenna elements per antenna panel 110 may be provided, as mentioned above.

According to further exemplary embodiments, at least one of the RF front ends RFa, RFb (FIG. 4), preferably all RF front ends RFa, RFb, may comprise at least one of: a) low noise amplifier, LNA, preferably controllable LNA, b) phase shifter, PS, preferably controllable PS, c) combiner CMB a, CMBb. As an example, a signal processing chain of the RF front end RFa may comprise an LNA receiving an RF signal from a single antenna element 1101 (FIG. 2) of the antenna panel 110a (FIG. 4), the LNA being configured to amplify the RF signal from the single antenna element 1101, and a phase shifter PS to apply a phase shift to the output signal of the LNA. As a further example, the RF front end RFa may comprise a first number of such processing chains "LNA, PS" which may e.g. correspond with the number of individual antenna elements of the antenna panel 110a (e.g., presently four).

According to further exemplary embodiments, at least one of the RF front ends RFa, RFb (FIG. 4), preferably all RF front ends RFa, RFb, may comprise a control logic (not shown), e.g. for beam and/or codebook management.

According to further exemplary embodiments, the output signals of the phase shifters PS may be combined, i.e. added, by means of the combiner CMBa. According to further exemplary embodiments, an output signal of the combiner CMBa may be considered as the received signal RXa of the antenna panel 110a, to which e.g. the frequency shift may be applied, e.g. by the unit 120a, whereby the frequency shifted signal RXa1 is obtained.

Similarly, the output signals of the phase shifters PS of the second RF front end RFb of FIG. 4 may be combined, i.e. added, by means of the combiner CMBb. According to further exemplary embodiments, an output signal of the combiner CMBb may be considered as the received signal RXb of the antenna panel 110b, to which e.g. the frequency shift may be applied, e.g. by the unit 120b, whereby the frequency shifted signal RXb1 is obtained.

According to further exemplary embodiments, the output signals RXa1, RXb1 of the frequency shift units 120a, 120b may be combined, i.e. added, by a further combiner CMB providing an aggregated RF received signal to the transceiver stage TRX for further processing, which, in turn, provides one or more signals derived from said transceiver stage processing to a baseband processing stage BB for baseband processing. As an example, the aggregated RF received signal available at the output of the further combiner CMP may comprise a spectrum comparable to the right side of FIG. 7. In other words, the individual spectra SPa, SPb associated with the individual RF received signals RXa, RXb are provided within the bandwidth BW (FIG. 7) for a common further processing by means of the elements TRX, BB.

According to further exemplary embodiments, processing within the transceiver stage TRX may e.g. comprise at least one of: filtering, gain control, RF control (i.e. providing one or more control signals CTRLa, CTRLb to the RF front ends RFa, RFb (e.g., for the local control logic of said RF front ends RFa, RFb), particularly based on operational parameters of the transceiver stage TRX, up-conversion, down-conversion.

According to further exemplary embodiments, processing within the baseband processing stage may e.g. comprise a control of the operation of the apparatus.

Figure 5:
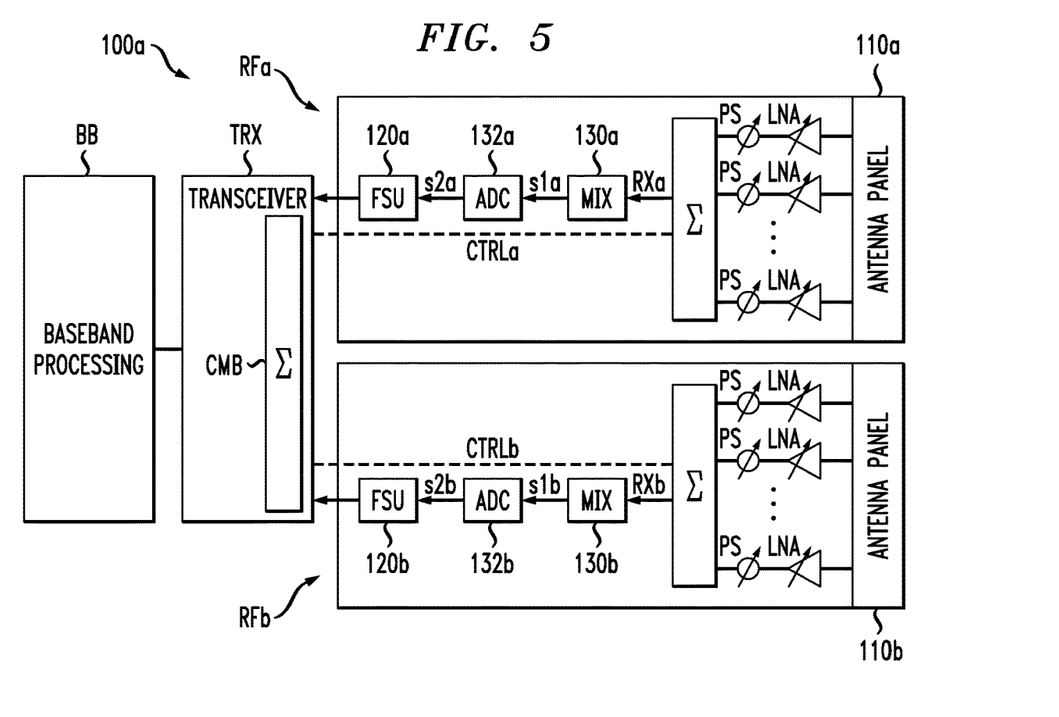

According to further exemplary embodiments, cf. FIG. 5, the apparatus 100a comprises at least two RF front ends RFa, RFb associated with a respective one of the at least two antenna panels 110a, 110b, wherein the at least one frequency shift unit 120a, 120b, e.g. CORDIC unit, is arranged in at least one of the at least two RF front ends RFa, RFb, wherein preferably each of the at least two RF front ends comprises one frequency shift unit.

Similar to FIG. 4, the RF front ends RFa, RFb of FIG. 5 may comprise at least one of: a) low noise amplifier, LNA, preferably controllable LNA, b) phase shifter, PS, preferably controllable PS, c) a combiner, which are not provided with reference signs in FIG. 5 for the sake of intelligibility.

In addition to the elements LNA, PS, CMBa of FIG. 4, the RF front end RFa of FIG. 5 further comprises a mixer 130a for down-converting the received signal of the antenna panel 110a, i.e., shifting the received signal RXa of the antenna panel 110a from an RF frequency range which may e.g. correspond with a carrier frequency fc and/or center frequency of the RF signals, to an intermediate frequency, IF, or a baseband frequency range, whereby a down-converted signal s1a may be obtained.

According to further exemplary embodiments, the RF front end RFa of FIG. 5 may comprise an analog-to-digital converter, ADC, 132a to transform the down-converted signal s1a from the analog domain to the digital domain, i.e. into a series of discrete amplitude values, i.e. a digital signal s2a.

According to further exemplary embodiments, the frequency shift unit, e.g. CORDIC unit 120a, applies the frequency shift to the digital signal s2a as obtained at the output of the ADC 132a.

According to further exemplary embodiments, the RF front end RFb of FIG. 5 may comprise a structure similar to that of the RF front end RFa, i.e. having a mixer 130b for down-converting the received signal RXb of the antenna panel 110b, whereby a down-converted signal s1b may be obtained, an ADC 132b to provide a digital signal s2b based on the down-converted signal s1b, and a frequency shift unit, e.g. CORDIC unit 120b, to apply the frequency shift to the digital signal s2b. The so shifted digital signals may be provided to a combiner CMB of the transceiver stage TRX of the apparatus 100a of FIG. 5.

According to further exemplary embodiments, processing within the transceiver stage TRX of FIG. 5 may e.g. comprise at least one of: filtering, gain control, RF control (i.e. providing one or more control signals CTRLa, CTRLb to the RF front ends RFa, RFb, particularly based on operational parameters of the transceiver stage TRX. According to further exemplary embodiments, down-conversion functionality is not required to be provided in the transceiver stage TRX of FIG. 5, because this may be done in the RF front ends RFa, RFb.

Figure 6:
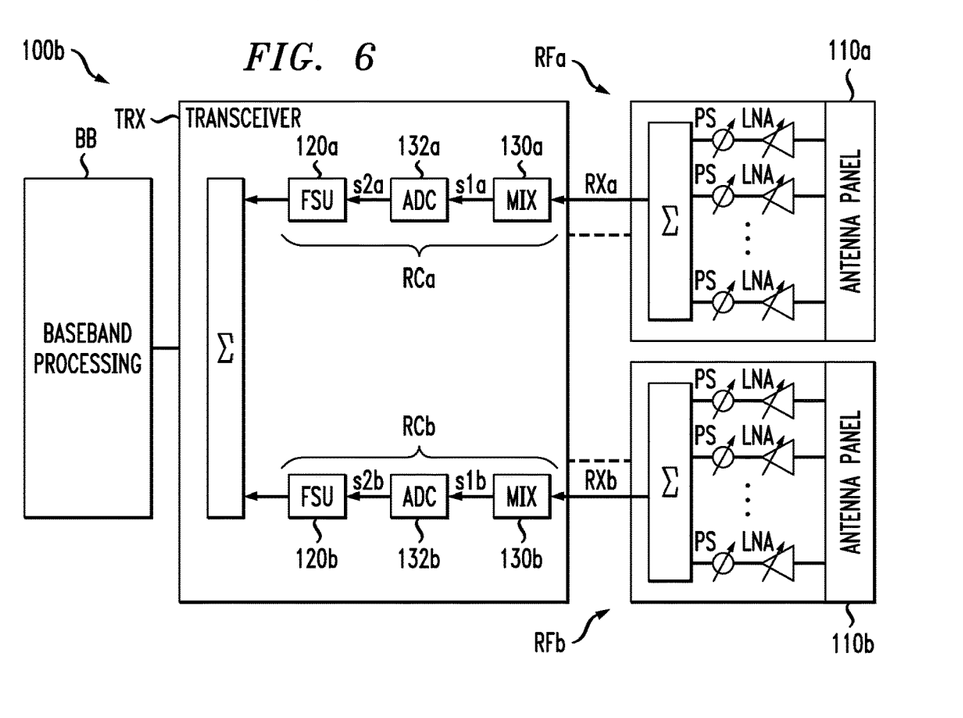

According to further exemplary embodiments, cf. FIG. 6, the apparatus 100b comprises a transceiver stage TRX for processing the received signals RXa, RXb, wherein the at least one frequency shift unit 120a, 120b is arranged in the transceiver stage TRX, wherein preferably each receiver chain RCa, RCb of the transceiver stage TRX comprises one frequency shift unit 120a, 120b. In this respect, according to further exemplary embodiments, the transceiver stage TRX may comprise at least one of: the mixer 130a, 130b, the ADC 132a, 132b as mentioned above in the context of the RF front end RFa, RFb of FIG. 5, and the frequency shift unit 120a, 120b, e.g.

CORDIC unit, may e.g. also be provided in the transceiver stage TRX and may apply the frequency shift to the digital signal s2a, s2b as obtained at the output of the ADC 132a, 132b in the transceiver stage TRX. In these embodiments 100b, the RF front ends RFa, RFb are not required to comprise a mixer and/or ADC and/or frequency shift unit, as these components are provided in the transceiver stage TRX. In other words, according to further exemplary embodiments, the RF front ends RFa, RFb of FIG. 6 may provide the output signals RXa, RXb of their respective combiner to the transceiver stage TRX, where further processing by means of the mixer, ADC and frequency shift unit, may be provided.

The embodiments 100a of FIGS. 5 and 100b of FIG. 6 are examples for embodiments wherein the frequency shift is applied to signals s2a, s2b derived from said received signals RXa, RXb (but not directly to said received signals RXa, RXb, cf. the exemplary embodiment 100 of FIG. 4).

According to further exemplary embodiments, the at least one frequency shift unit 120a, 120b is arranged between a or the transceiver stage TRX and a or the RF front end RFa, RFB, cf. e.g. FIG. 4.

According to further exemplary embodiments, the transceiver stage TRX and, optionally, a baseband processing stage BB of the apparatus 100, 100a, 100b are configured to process signals with a bandwidth corresponding to an aggregated bandwidth of the frequency spectra SPa, SPb (FIG. 7) associated with the at least two antenna panels 110a, 110b, preferably corresponding to an aggregated bandwidth of the frequency spectra associated with all antenna panels of the apparatus. This enables to simultaneously process, e.g. by means of the baseband processing stage BB and/or the transceiver stage TRX, signals related to the plurality of frequency spectra associated with the at least two antenna panels.

According to further exemplary embodiments, the apparatus, preferably the baseband processing stage and/or the transceiver stage, is configured to separate the frequency spectra SPa, SPb (FIG. 7) associated with the at least two antenna panels 110a, 110b, for example by filtering. This way, individual received signals associated with individual ones of the antenna panels 110a, 110b may be "reconstructed" by the baseband processing stage BB and/or the transceiver stage TRX, e.g. for decoding.

According to further exemplary embodiments, the apparatus 100, 100a, 100b is configured to at least temporarily operate the at least two antenna panels 110a, 110b simultaneously or in a temporally at least partly overlapping fashion, whereby e.g. beam measurements and/or other aspects, e.g. of Beam Management, particularly at a UE side, may be accelerated.

Figure 8B:
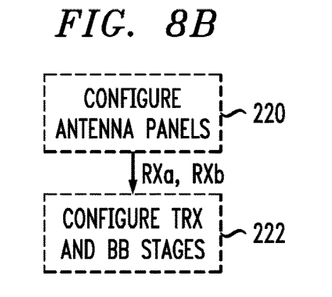

According to further exemplary embodiments, cf. FIG. 8B, the apparatus 100, 100a, 100b is configured to perform at least one of: configuring 220 the at least two antenna panels 110a, 110b, 110c for simultaneous or temporally at least partly overlapping operation, configuring 222 the transceiver stage TRX and/or the baseband processing stage BB to operate with a bandwidth BW (FIG. 7) corresponding to an aggregated bandwidth of the received signals of the configured at least two antenna panels.

Figure 8C:
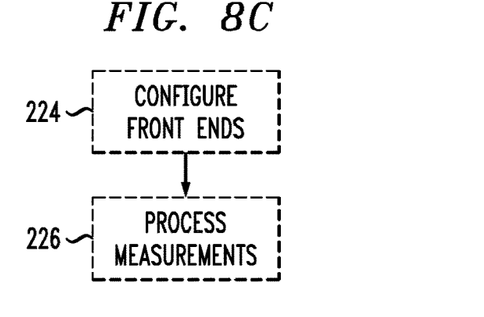

According to further exemplary embodiments, cf. FIG. 8C, the apparatus 100, 100a, 100b is configured to perform at least one of: configuring 224 the RF front ends RFa, RFb (FIG. 4) of at least two antenna panels 110a, 110b to perform measurements, particularly regarding a single codebook entry, processing 226 (FIG. 8C) the measurements, wherein the processing preferably comprises separating the frequency spectra SPa, SPb (FIG. 7) of different ones of the measurements and decoding, preferably individually, each of the measurements.

Figure 9A:
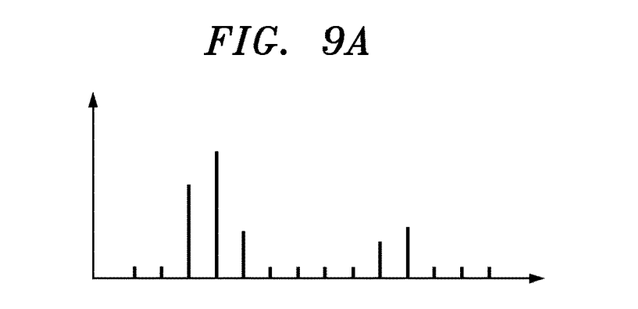
Figure 9B:
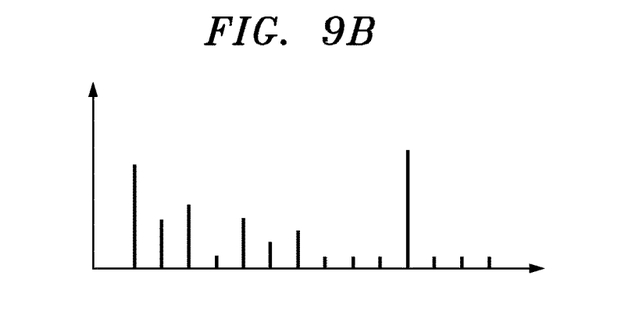

As an example, FIGS. 9A, 9B each schematically depict power values over a codebook index according to further exemplary embodiments, as can e.g. be obtained by the measurements related to steps 224, 226 explained above with respect to FIG. 8C.

Figure 8D:
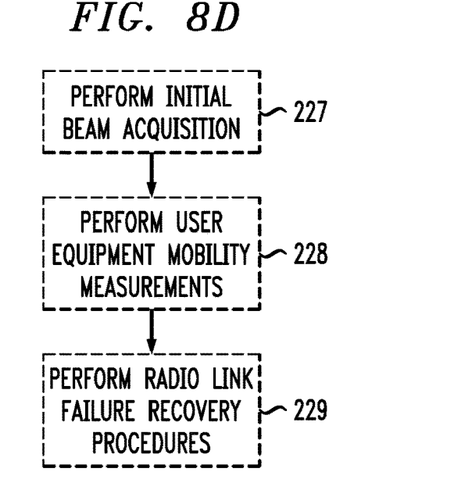

According to further exemplary embodiments, cf. FIG. 8D, the apparatus 100, 100a, 100b is configured to at least temporarily perform at least one of the following elements using the at least two antenna panels 110a, 110b, 110c in parallel (or at least in a temporally overlapping fashion): initial beam acquisition 227, user equipment mobility measurements 228, radio link failure recovery procedures 229.

Further exemplary embodiments relate to a user equipment, UE, 10 comprising at least one apparatus 100, 100a, 100b according to the embodiments.

Further exemplary embodiments relate to a method of operating an apparatus 100, 100a, 100b for receiving radio frequency, RF, signals, as already explained above with reference to FIG. 8A.

According to further exemplary embodiments, the apparatus 100, 100a, 100b applies the frequency shift to the at least one of the received signals RXa, RXb (or to signals s2a, s2b derived therefrom) such that the at least two frequency spectra SPa, SPb of the received signals (or of the signals derived therefrom) do not overlap.

According to further exemplary embodiments, the apparatus at least temporarily performs at least one of the following elements using the at least two antenna panels in parallel: initial beam acquisition, user equipment mobility measurements, radio link failure recovery procedures.

Further exemplary embodiments relate to a use of the apparatus 100, 100a, 100b according to the embodiments and/or the UE 10 according to the embodiments and/or the method according to the embodiments for at least one of: a) simultaneous reception of RF signals from a plurality of antenna panels 110a, 110b, 110c, b) performing at least one of the following elements using the at least two antenna panels 110a, 110b, 110c in parallel: initial beam acquisition, user equipment mobility measurements, radio link failure recovery procedures, c) decreasing a time needed for switching to another UE antenna panel 110a, 110b, 110c and/or beam, d) enabling monitoring of alternative links without disturbing an existing primary link, e) reducing a search time for beam search, f) reducing a current and/or energy consumption, particularly for beam search, g) reducing a scanning time for initial (beam) acquisition and/or neighbor cell measurements.

In the following, further aspects and exemplary embodiments are disclosed which may be—either alone or in combination with each other—combined with any of the above explained exemplary embodiments or any combination thereof.

According to further exemplary embodiments, each antenna panel 110a, 110b, 110c can measure one beam (e.g., corresponding to a code book entry) at one instant of time or time step, i.e. the UE 10 can have not only one measurement from one antenna panel per time step, as with some conventional architectures (FIG. 3), but e.g. one measurement from each antenna panel 110a, 110b, 110c in parallel.

According to further exemplary embodiments, the baseband processing stage BB may be configured to calculate and/or demodulate received signals RXa, RXb associated with each antenna panel individually. Thus, e.g. individual RF power measurements based on SSB (SS/PBCH Block, Synchronization Signal (SS) and Physical Broadcast Channel (PBCH)) reference symbols or CSI (Channel State Information)-RS (Reference Signal) transmitted symbol from a gNB beam may be made.

According to further exemplary embodiments, the UE 10 (FIG. 1) may read an SSB information from a gNB, wherein e.g. the SSB information may be transmitted in 4 OFDM symbols across 240 subcarriers and in pre-defined bursts across the time domain on the configured PRBs. The bursts periodicity in terms of time slots depends on which subcarrier spacing numerology is configured.

According to further exemplary embodiments, the UE 10 may assume that reception occasions of a physical broadcast channel (PBCH), Primary Sync Signal (PSS), and Secondary Sync Signal (SSS) are in consecutive symbols and form a SS/PBCH block.

According to further exemplary embodiments, in the context of SSB mapping in the time domain, the first symbol is the PSS, second symbol is PBCH, third symbol is SSS and fourth symbol is PBCH. According to further exemplary embodiments, a first symbol index of a candidate SSB may be determined by the UE 10 according to a subcarrier spacing of the SSB, wherein index "0" e.g. corresponds to a first symbol of a first slot in a half-frame. To enable a beam sweeping of SS and PBCH, according to further exemplary embodiments, a transmission of SS blocks may be organized in a periodical series of SS burst set such that the transmission of SS blocks within SS burst set is confined to a 5 ms window (half radio frame), regardless of the SCS (subcarrier spacing).

According to further exemplary embodiments, in the context of SSB resource mapping in the frequency domain, an SS/PBCH block may consist of 240 contiguous subcarriers with the subcarriers numbered in increasing order from 0 to 239 within the SS/PBCH block. Thus, a maximum bandwidth of the SSB is 240 subcarriers*240 kHz subcarrier spacing (for FR2, numerology 4)→57.6 MHz spacings. According to further exemplary embodiments, the SSB bandwidth of e.g. 57.6 MHz is not a problem to combine in frequency, as proposed by exemplary embodiments, because a useful signal bandwidth of the UE 10 may e.g. be 400 MHz.

According to further exemplary embodiments, assuming that the UE 10 comprises six UE antenna panels 110a, 110b, . . . , it is possible to sample all associated 6 SSB blocks of these six UE antenna panels in a 345.6 MHz bandwidth BW. This may be particularly advantageous, because according to further exemplary embodiments, six UE antenna panels enable to cover 360 degree, i.e. a full spherical coverage. In other words, even with an antenna panel configuration providing six UE antenna panels, which may enable full spherical coverage, efficient, particularly simultaneous, processing of received signals RXa, RXb, . . . associated with said six UE antenna panels, e.g. for sampling said six SSB blocks, is enabled.

According to further exemplary embodiments, e.g. for an exemplary beam scanning procedure, the UE 10 (FIG. 1) may get a full SSB sweep from each of its antenna panels 110a, 110b, . . . and beam codebook entry in parallel speeding up the process for a full SSB decoding. Initially, the UE 10 may configure the devices BB and TRX (FIG. 4, also cf. step 222 of FIG. 8B) followed by a data path configuration for the full bandwidth (SSB bandwidth*number of UE antenna panels). According to further exemplary embodiments, the baseband processing stage BB may separate each data path, e.g. by filtering, and may perform decoding individually for each SSB.

According to further exemplary embodiments, e.g. for an UE connected state, a mobility scan on alternative antenna panels 110b, 110c, . . . may be performed in parallel, especially while maintaining a currently active link towards a serving gNB, e.g. on a main antenna panel 110a. This may be beneficial e.g. for a low latency critical scenario effectively removing monitoring overhead. In this case, as an example, the receiver bandwidth requirement of a receiver path of the transceiver TRX may be:

Monitor_UE_panels*SSB+ active_link_BW<TRX_BW_max, wherein #Monitor_UE_panels characterizes the number of simultaneously active panels for monitoring, SSB characterizes the bandwidth associated with one SSB, active_link_BW characterizes a bandwidth required for a currently active link, and TRX_BW_max characterizes the maximum bandwidth of the receiver path of the transceiver TRX.

According to further exemplary embodiments, the UE 10 may decode the MIB (Master Information Block) & SIB1 (System Information Block 1) of all potential handover gNBs and may time its own beam scan to a periodicity of the SSB burst so it may measure on the same SSB index each SSB burst. According to further exemplary embodiments, the UE 10 may only request a repetition of CSI-RS/SSB from the gNB it is connected to.

According to further exemplary embodiments, the UE 10 may, preferably via its baseband processing stage BB, calculate and/or demodulate received signals from each UE antenna element 110a, 110n, . . . individually. According to further exemplary embodiments, the UE 10 may, preferably via its baseband processing stage BB, perform RF power measurements based on SSB reference symbols and/or any transmitted symbols from a beam of a gNB.

According to further exemplary embodiments, the principle according to the embodiments may be used for panel switching of antenna panels and/or beam management and/or inter-cell mobility.

According to further exemplary embodiments, the principle according to the embodiments may support both an idle/inactive state and a connected state of the UE 10.

According to further exemplary embodiments, the SSB timing is known by the UE 10 and can be used to fine tune the timing for the search.

According to further exemplary embodiments, for the UE connected state, a parallel mobility scan on alternative antenna panels may be performed while maintaining an active link towards a serving gNB on the main antenna panel.

According to further exemplary embodiments, the UE may scan two antenna panels simultaneously, by using only one polarization at each panel, which may be sufficient for SSB characterization.

According to further exemplary embodiments, the measurements can be used for a) Initial beam selection, b) panel switching, c) beam management, c) inter-cell mobility.

According to further exemplary embodiments, a configuration of the RF front end(s) RFa, RFb may include: a) Time slot (start and stop)—e.g., characterizing a timing of general reception for BB decoding, b) Center frequency fc, c) Bandwidth BW, d) Beam codebook entry/entries.

According to further exemplary embodiments, exemplary RF front end measurements may distinguish a) initial cell search (after switching on the UE 10, or after a coverage hole, or after an extreme power saving mode), idle/inactive, and connected.

According to further exemplary embodiments, if an antenna panel is blocked, the measurements for that individual panel can be switched off (e.g., for further current saving), or one may keep them on as allowed to listen still.

According to further exemplary embodiments, the principle according to exemplary embodiments may be combined with a combination of hybrid architecture and CORDIC unit, meaning that a hybrid beamforming architecture can still have time and current consumption savings implementing the "CORDIC architecture" according to exemplary embodiments.

The principle according to exemplary embodiments enables parallel UE antenna panels operation in receive (Rx) operation. In a multi-panel UE, which comprises two or more antenna panels 110a, 110b, applying the principle according to exemplary embodiments may significantly decrease the time needed for switching to another UE antenna panel & beam since the panel measurements performed on the candidate UE antenna panels can be done in parallel, i.e. simultaneously. Moreover, the principle according to exemplary embodiments may enable monitoring of alternative links without disturbing the primary link thus enhancing throughput. Furthermore, the current consumption may be lower due to the lower search time.

For higher RF frequencies (e.g. FR4, beyond 52.6 GHz), path loss will increase, and higher antenna gain may be required to maintain enough link budget. Higher antenna gain, however, may result in narrower beams. Narrower beams may require more measurement points to do a full spherical sweep. These issues may be addressed by the principle according to exemplary embodiments, because the simultaneous measurements enabled by the embodiments may accelerate the required measurements.

The invention claimed is:

1. Apparatus for receiving radio frequency (RF) signals from first and second antenna panels configured to provide respective first and second received signals with associated first and second frequency spectra, wherein the apparatus comprises:
   first and second RF front ends respectively associated with the first and second antenna panels and configured to respectively apply RF signal processing to the first and second received signals;
   one or more frequency shift units configured to apply a frequency shift to at least one of the first and second received signals or at least one signal derived from at least one of the first and second received signals to form first and second adjacent signals having adjacent frequency spectra such that center frequencies of the adjacent frequency spectra comprise a predetermined frequency distance from each other;
   a combiner configured to combine the first and second adjacent signals to form a single combined signal having an aggregated bandwidth; and
   one or more downstream processing stages configured to process the single combined signal using common signal processing to generate at least one control signal for controlling the RF signal processing of at least one of the first and second RF front ends, wherein the one or more downstream processing stages are configured to handle the aggregated bandwidth of the single combined signal.

2. The apparatus according to claim 1, wherein the one or more frequency shift units are configured to apply the frequency shift such that the adjacent frequency spectra do not overlap.

3. The apparatus according to claim 1, wherein each frequency shift unit is a coordinate rotation digital computer.

4. The apparatus according to claim 1, wherein the one or more frequency shift units are arranged in the first and second RF front ends.

5. The apparatus according to claim 1, wherein the one or more downstream processing stages comprise a transceiver stage comprising the one or more frequency shift units.

6. The apparatus according to claim 1, wherein the one or more frequency shift units are arranged between the one or more downstream processing stages and the RF front ends of the apparatus.

7. The apparatus according to claim 1, wherein the one or more downstream processing stages are configured to separate the adjacent frequency spectra by filtering.

8. The apparatus according to claim 1, wherein the apparatus is configured to perform at least one of: configuring the first and second antenna panels for simultaneous operation, configuring a transceiver stage and a baseband processing stage to operate with a bandwidth corresponding to the aggregated bandwidth of the single combined signal, configuring RF front ends associated with the first and second antenna panels to perform measurements, and separating the adjacent frequency spectra of different ones of the measurements and decoding individually each of the measurements.

9. The apparatus according to claim 1, wherein the apparatus is configured to at least temporarily perform at least one of the following elements using the first and second antenna panels in parallel: initial beam acquisition, user equipment mobility measurements, and radio link failure recovery procedures.

10. The apparatus of claim 1, further comprising the first and second antenna panels.

11. The apparatus of claim 1, wherein:
the apparatus is configured to receive one or more additional RF signals from one or more additional antenna panels;
the one or more frequency shift units are configured to generate three or more adjacent signals having three or more adjacent frequency spectra;
the combiner is configured to combine the three or more adjacent signals into the single combined signal having the aggregated bandwidth; and
the one or more downstream processing stages are configured to process the single combined signal, wherein the one or more downstream processing stages are configured to handle the aggregated bandwidth of the single combined signal.

12. The apparatus of the claim 1, wherein total bandwidth of the first and second frequency spectra of the first and second received signals is greater than the aggregated bandwidth of the single combined signal.

13. Method of operating an apparatus for receiving RF signals from first and second antenna panels configured to provide respective first and second received signals with associated first and second frequency spectra, the method comprising:
applying front-end RF signal processing to the first and second received signals;
applying a frequency shift to at least one of the first and second received signals or to at least one signal derived from at least one of the first and second received signals to form first and second adjacent signals having adjacent frequency spectra such that center frequencies of the adjacent frequency spectra comprise a predetermined frequency distance from each other;
combining the first and second adjacent signals to form a single combined signal having an aggregated bandwidth; and
processing the single combined signal at one or more downstream processing stages using common signal processing to generate at least one control signal for controlling the front-end RF signal processing, wherein the one or more downstream processing stages are configured to handle the aggregated bandwidth of the single combined signal.

14. The method according to claim 13, wherein the frequency shift is applied such that the adjacent frequency spectra do not overlap.

15. The method according to claim 13, further comprising at least temporarily performing at least one of the following elements using the first and second antenna panels in parallel: initial beam acquisition, user equipment mobility measurements, and radio link failure recovery procedures.

16. The method of claim 13, wherein the apparatus further comprises the first and second antenna panels.

17. The method of claim 13, further comprising receiving one or more additional RF signals from one or more additional antenna panels, wherein:
the frequency shift is applied to generate three or more adjacent signals having three or more adjacent frequency spectra;
the three or more adjacent signals are combined into the single combined signal having the aggregated bandwidth; and
the single combined signal is processed at the one or more downstream processing stages, wherein the one or more downstream processing stages are configured to handle the aggregated bandwidth of the single combined signal.

18. The method of claim 13, wherein total bandwidth of the first and second frequency spectra of the first and second received signals is greater than the aggregated bandwidth of the single combined signal.

* * * * *